United States Patent
Moreno et al.

(10) Patent No.: US 11,393,476 B2
(45) Date of Patent: Jul. 19, 2022

(54) AUTOMATICALLY DETERMINING LANGUAGE FOR SPEECH RECOGNITION OF SPOKEN UTTERANCE RECEIVED VIA AN AUTOMATED ASSISTANT INTERFACE

(71) Applicant: Google LLC, Mountain View, CA (US)

(72) Inventors: Ignacio Lopez Moreno, New York, NY (US); Lukas Lopatovsky, Kilchberg (CH); Ágoston Weisz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 43 days.

(21) Appl. No.: 16/618,994

(22) PCT Filed: Jan. 8, 2019

(86) PCT No.: PCT/IB2019/000353
§ 371 (c)(1),
(2) Date: Dec. 3, 2019

(87) PCT Pub. No.: WO2020/039247
PCT Pub. Date: Feb. 27, 2020

(65) Prior Publication Data
US 2021/0074295 A1 Mar. 11, 2021

Related U.S. Application Data

(60) Provisional application No. 62/721,982, filed on Aug. 23, 2018.

(51) Int. Cl.
*G10L 15/26* (2006.01)
*G10L 15/00* (2013.01)
(Continued)

(52) U.S. Cl.
CPC ........... *G10L 15/26* (2013.01); *G10L 15/005* (2013.01); *G10L 15/063* (2013.01); *G10L 15/183* (2013.01); *G10L 15/22* (2013.01)

(58) Field of Classification Search
CPC ... G10L 15/005; G10L 15/063; G10L 15/183; G10L 15/22; G10L 15/26; G10L 15/32
See application file for complete search history.

(56) References Cited

U.S. PATENT DOCUMENTS

| 5,062,143 A | 10/1991 | Schmitt |
| 7,403,890 B2 | 7/2008 | Roushar |

(Continued)

FOREIGN PATENT DOCUMENTS

CN 108335693 7/2018

OTHER PUBLICATIONS

Metze, F. et al., "Confidence Measure Based Language Identification"; International Conference on Acoustics, Speech, and Signal Processing; IEEE, vol. 3; pp. 1827-1830; Jun. 5, 2000.

(Continued)

*Primary Examiner* — Angela A Armstrong
(74) *Attorney, Agent, or Firm* — Middleton Reutlinger

(57) ABSTRACT

Implementations relate to determining a language for speech recognition of a spoken utterance, received via an automated assistant interface, for interacting with an automated assistant. In various implementations, audio data indicative of a voice input that includes a natural language request from a user may be applied as input across multiple speech-to-text ("STT") machine learning models to generate multiple candidate speech recognition outputs. Each STT machine learning model may trained in a particular language. For each respective STT machine learning model of the multiple STT models, the multiple candidate speech recognition outputs may be analyzed to determine an entropy score for the respective STT machine learning model. Based on the entropy scores, a target language associated with at least one STT machine learning model of the multiple STT machine (Continued)

learning models may be selected. The automated assistant may respond to the request using the target language.

17 Claims, 5 Drawing Sheets

(51) Int. Cl.
*G10L 15/06* (2013.01)
*G10L 15/183* (2013.01)
*G10L 15/22* (2006.01)

(56) References Cited

U.S. PATENT DOCUMENTS

| | | | | |
|---|---|---|---|---|
| 7,761,296 | B1* | 7/2010 | Bakis | ............... G10L 13/02 |
| | | | | 704/247 |
| 8,031,943 | B2 | 10/2011 | Chen et al. | |
| 9,536,521 | B2 | 1/2017 | Golding et al. | |
| 2002/0160341 | A1 | 10/2002 | Yamada et al. | |
| 2013/0138422 | A1 | 5/2013 | Daye et al. | |
| 2013/0238336 | A1* | 9/2013 | Sung | ............... G10L 15/005 |
| | | | | 704/255 |
| 2015/0364129 | A1* | 12/2015 | Gonzalez-Dominguez | ............... |
| | | | | G10L 15/005 |
| | | | | 704/251 |
| 2016/0117593 | A1* | 4/2016 | London | ............... G06F 40/58 |
| | | | | 706/11 |

OTHER PUBLICATIONS

European Patent Office; International Search Report and Written Opinion of PCT/IB2019/000353; 16 pages; dated Oct. 8, 2019.
Intellectual Property India; Examination Report issued in Application No. 202027053610; 6 pages; dated Aug. 18, 2021.
European Patent Office; Communication pursuant to Article 94(3) EPC issued in Application No. 19732735.3; 6 pages, dated Nov. 24, 2021.

* cited by examiner

AUTOMATICALLY DETERMINING LANGUAGE FOR SPEECH RECOGNITION OF SPOKEN UTTERANCE RECEIVED VIA AN AUTOMATED ASSISTANT INTERFACE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

However, many speech recognition engines are configured to recognize speech in only a single language. For multilingual users and/or households, such single language speech recognition engines can be unsatisfactory, and can cause an automated assistant to fail and/or provide erroneous output when a spoken utterance is received in an additional language that is not the single language supported by the speech recognition engines. This can render the automated assistant unusable and/or lead to excess usage of computational and/or network resources. Excess usage of computational and/or network resources can be a result of a user needing to provide a further spoken utterance, that is in the single language supported, when the automated assistant fails or provides erroneous output. Such further spoken utterance must additionally be processed by a corresponding client device and/or remote automated assistant component(s), thereby causing additional usage of various resources.

Other speech recognition engines may be configured to recognize speech in multiple languages, but require a user to explicitly designate which of the multiple languages should be utilized in speech recognition at a given time. For example, some of the other speech recognition engines may require a user to manually designate a default language to be utilized in speech recognition of all spoken utterances received at a particular client device. To change the default language to another language, the user can be required to interact with a graphical and/or audible interface to explicitly alter the default language. Such interaction can lead to excess usage of computational and/or network resources in the rendering of the interface, the processing of inputs of the user provided via the interface, etc. Further, it may often be the case that a user forgets to change the default language prior to providing a spoken utterance that is not currently the default language. This can render the automated assistant unusable and/or lead to excess usage of computational and/or network resources as described above.

SUMMARY

Implementations described herein relate to systems, methods, and apparatus for automatically determining a language for speech recognition of a spoken utterance received via an automated assistant interface. Some implementations described herein relate to identifying the language of a user request, processing the request using said language, and/or providing a response in said language. In various implementations, a request submitted by a first user to an automated assistant may be in a first language. Processing to such a request may require the automated assistant to determine what language the first user is speaking. Additionally, the first user may prefer that the automated assistant also provide its reply in the first language. The same scenario may be repeated in one or more additional languages that are different from the first language and may be spoken by the first user or by one or more additional users. Techniques are described herein to identify the language of a user's request, process the request using that language, and/or reply in that language to the request.

In order to identify the language of a user's request, an automated assistant may provide data indicative of an audio recording of the user's request (e.g., the audio recording itself, a reduced-dimensionality embedding, etc.) to a plurality of machine learning models configured to generate speech-to-text ("STT") output. Each machine learning model may be designed to perform STT processing in a particular language. To this end, each of these machine learning models may analyze the audio recording of the user's request (or data indicative thereof) to provide text data of multiple candidate phrases or "hypotheses" that correspond to potential meanings of the audio recording in the respective language of the model.

In various implementations, a determination may be made of which model should be used, and ultimately, which language should be used to process the request and/or provide responsive output. In some implementations, for each machine learning model, an entropy score may be calculated, with an entropy score indicative of low entropy being representative of a good candidate for the user's language and an entropy score indicative of high entropy being representative of a bad candidate for the user's language. As used herein, the entropy score generally refers to a level of entropy or diversity among the multiple candidate STT phrases. In some implementations, the entropy score may be based on the average and/or length normalized edit distance between each candidate phrase and each of the remaining additional phrases for each machine learning model corresponding to a particular language. This may be calculated based on the character-by-character and/or word-by-word difference between any two given phrases. Additionally or alternatively, the candidate STT phrases may be embedded into a reduced-dimensionality space, and semantic distances between them may be calculated, e.g., based on Euclidian distances. The average distance or some other value calculated from the distances may be used to determine the entropy score for that particular STT machine learning model. The automated assistant may then select the target language based on the entropy score for each model. In some implementations, the automated assistant may further take into account other factors such as confidence scores for individual candidate phrases, languages that have been used with the assistant in the past, and the context of the interaction between the user and the assistant, such as the location.

As an example, suppose Dave and Alice wish to both use an automated assistant. Suppose Dave speaks English while Alice speaks Spanish. Dave and Alice would like to take turns using the automated assistant and have it reply in their native language without having to manually change the settings of the assistant. Suppose Alice goes first, and asks the assistant, in Spanish, to set an alarm for 8:00 am. The assistant will feed the audio recording of her request (or other data indicative thereof) into the multiple machine learning models, generate candidate phrases corresponding to her request in multiple languages, generate entropy scores for each of the various language models, and choose the language based on several factors, including based on the language model having the lowest entropy score, which in this case would be Spanish. The assistant would then process Alice's request in Spanish as well as respond in Spanish to let her know that the alarm has been set. Next, Dave may speak to the assistant in English and request that it dim the lights. The same process may repeat except, in this case, the language model with the lowest entropy score would be English, and the request would be processed in English and the assistant would respond in English to let Dave know that the lights were being dimmed.

Techniques described herein give rise to a variety of technical advantages. Processing user requests to determine the language in which they are given enables the automated assistant to understand and respond in multilingual situations, such as multilingual households or destinations with international travelers, without requiring multiple users to manually switch the assistant's language of operation in the assistant's settings. This may save time for users, as well as conserve the computing resources a user overhead required to manually switch the language of the assistant to communicate with it.

In some implementations, a method implemented by one or more processors is set forth and includes: receiving, at a microphone of a computing device operated by a user to engage with an automated assistant, voice input from the user, wherein the voice input includes a request from the user; applying data indicative of an audio recording of the voice input as input across multiple STT machine learning models to generate multiple candidate speech recognition outputs, wherein each STT machine learning model of the multiple STT machine learning models is trained in a particular language; analyzing, for each respective STT machine learning model of the multiple STT models, the multiple candidate speech recognition outputs to determine an entropy score for the respective STT machine learning model; selecting, as a target language, the language associated with at least one STT machine learning model of the multiple STT machine learning models based on the entropy scores associated with the multiple STT machine learning models; and causing the automated assistant to respond to the request from the user using the target language.

In various implementations, the entropy score for the respective STT machine learning model may be determined based on a count of the multiple candidate speech recognition outputs for the respective STT model. In various implementations, the entropy score for the respective STT machine learning model may be determined based on differences between the multiple candidate speech recognition outputs of the respective STT model. In various implementations, the entropy score for the respective STT machine learning model may be determined based on semantic distances between the multiple candidate speech recognition outputs of the respective STT model in latent space.

In various implementations, selecting the target language may be further based on one or more of: historical context of the computing device, current context of the computing device, or confidence scores calculated for each candidate speech recognition output. In various implementations, the entropy score for each respective STT machine learning model may be calculated using the candidate speech recognition outputs generated by the respective STT machine learning model that have confidence scores above a particular threshold.

In various implementations, the method may further include causing the automated assistant to prompt the user for confirmation before performing any task based on the user's request if the entropy score for the selected STT machine learning model satisfies a pre-determined threshold. In various implementations, the causing may include causing the automated assistant to provide, as audio output, a natural language response to the request of the user, wherein the natural language response is provided in the target language.

In various implementations, the multiple STT machine learning models may include a subset of a superset of STT machine learning models, and the method may further include selecting the subset from the superset based on one or more of: a historical context of the computing device, a current context of the computing device, or settings previously set by the user for the automated assistant.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
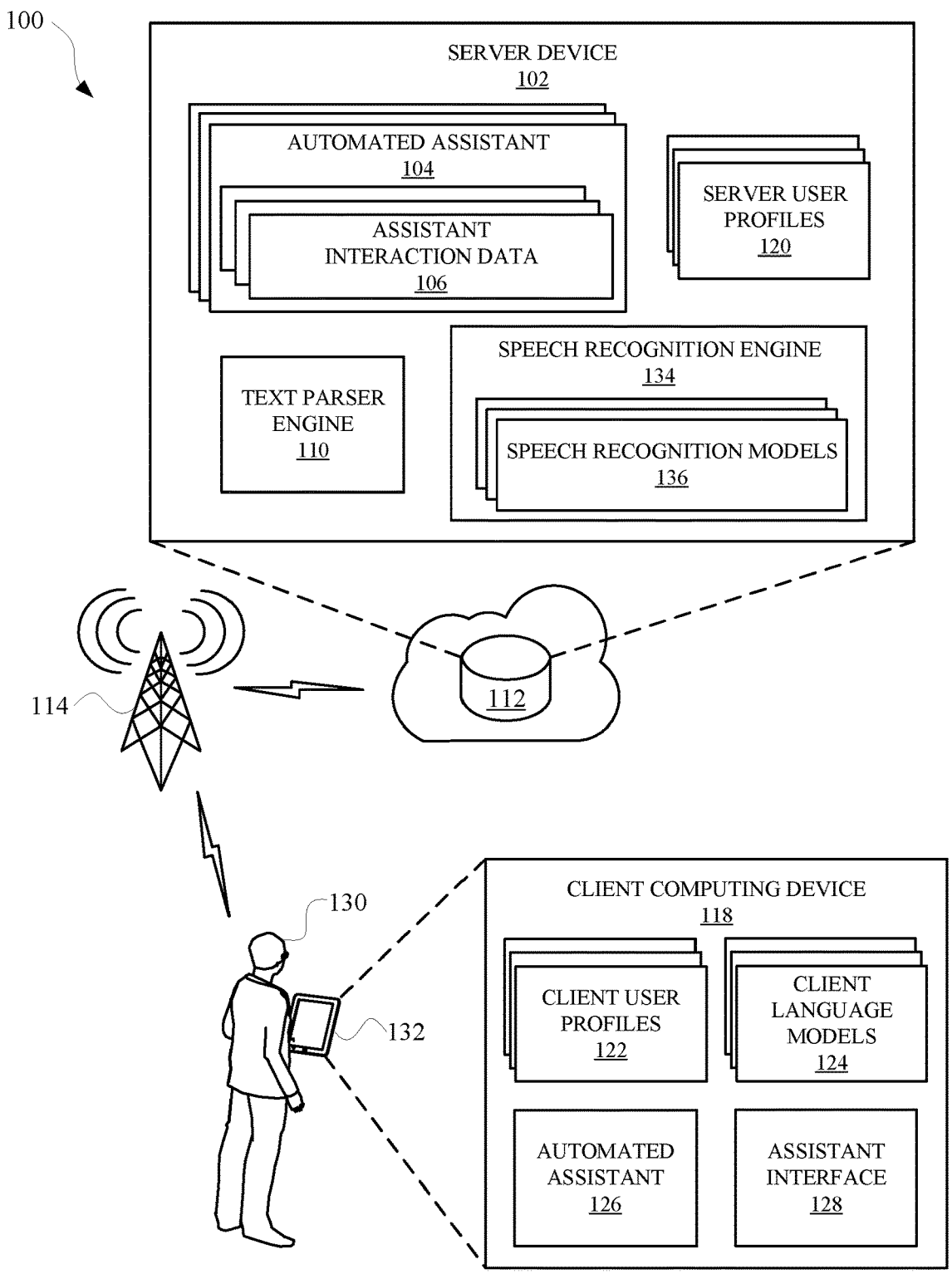
FIG. 1 illustrates a system for selecting a language for an automated assistant to interact with a user.

FIG. 1 illustrates a system 100 for selecting a language for an automated assistant 104 to interact with a user 130. The automated assistant 104 can operate, in part via an automated assistant 126 that is provided at one or more client devices, such as client computing device 118 (e.g., a portable computing device 132), and in part via one or more remote computing device(s) 112, such as a server device 102 (e.g., which may form part of what is often referred to as "cloud infrastructure" or simply "the cloud"). When "automated assistant 104" is used herein, it may refer to one or both of 104 and 126. The user 130 can interact with the automated assistant 104 via an assistant interface 128 of the client computing device 118. The assistant interface 128 includes user interface input device(s) and user interface output device(s) for use by the automated assistant 126 in interfacing with the user 130.

The assistant interface 128 accepts user interface inputs of the user 130 that are directed to the automated assistant 104, and renders content from the automated assistant 104 for presentation to the user 130. The assistant interface 128 can include one or more of a microphone, speaker, a display panel, a camera, a touch screen display, and/or any other user interface device(s) of the client computing device 118. The assistant interface 128 can also include a display, projector, a speaker, and/or any other user interface output device(s) of the client computing device 118 that can be used to render content from the automated assistant 104. A user can initialize the automated assistant 104 by providing a verbal, textual, or a graphical input to the assistant interface 128 to cause the automated assistant 104 to perform a function (e.g., provide data, control a peripheral device, access an agent, etc.). In some implementations, the client computing device 118 may include a display device, which can be a display panel that includes a touch interface for receiving touch inputs and/or gestures for allowing a user to control applications of the client computing device 118 via the touch interface. In some implementations, client computing device 118 can lack a display device, thereby providing an audible user interface output, without providing a graphical user interface output. Furthermore, the client computing device 118 can provide a user interface input device, such as a microphone(s), for receiving spoken natural language inputs from the user 130 (and from additional unillustrated users).

The client computing device 118 can be in communication with the remote computing device 112 over one or more networks 114, such as the internet. The client computing device 118 can offload computational tasks to the remote computing device 112 in order to, for example, conserve computational resources at the client device 118 and/or leverage more robust resources available at the remote computing device 112. For instance, the remote computing device 112 can host the automated assistant 104, and the client computing device 118 can transmit inputs received at one or more assistant interfaces to the remote computing device 112. However, in some implementations, the automated assistant 104 can be hosted by the automated assistant 126 at the client computing device 118. In various implementations, all or less than all aspects of the automated assistant 104 can be implemented by the automated assistant 126 at the client computing device 118. In some of those implementations, aspects of the automated assistant 104 are implemented via the local automated assistant 126 of the client computing device 118 and interface with the remote computing device 112 that implements other aspects of the automated assistant 104.

The remote computing device 112 can optionally serve a plurality of users and their associated assistant applications via multiple threads. In implementations where all or less than all aspects of the automated assistant 104 are implemented via the local automated assistant 126 of the client computing device 118, the local automated assistant 126 can be an application that is separate from an operating system of the client device 118 (e.g., installed "on top" of the operating system)—or can alternatively be implemented directly by the operating system of the client device 118 (e.g., considered an application of, but integral with, the operating system).

In some implementations, the remote computing device 112 can include a speech recognition engine 134 that can process audio data received at assistant interface 128 to determine text and/or other semantic representation(s) of a spoken utterance embodied in the audio data. The speech recognition engine 134 can utilize one or more speech recognition models 136, at least some of which may be referred to as "speech-to-text" or "STT" models, in determining text and/or other semantic representations of a spoken utterance embodied in audio data. As described herein, multiple speech recognition models 136 can be provided, and each speech recognition model can be for a corresponding language. For example, a first speech recognition model can be for English, a second speech recognition model can be for French, a third for Spanish, a fourth for Mandarin, a fifth for Japanese, etc. In some implementations, a language model can include or refer to an acoustic model, a speech recognition model, an invocation phrase model, a voice-to-text model, a voice-to-semantic representation model, a text-to-semantic representation model, and/or any other model that can be used to translate a natural language input into data that can be processed by an application or a device.

In some implementations, the speech recognition models 136 each include one or machine learning models (e.g., neural network models) and/or statistical models for determining text (or other semantic representation) that corresponds to a spoken utterance embodied in audio data. In some implementations, the speech recognition engine 134 can utilize one of the speech recognition models 136 to determine phonemes, for a corresponding language, that are included in the audio data, and then generate text, for the corresponding language, based on the determined phonemes. In some implementations, a speech recognition model receives an audio recording of voice input, e.g., in the form of digital audio data, and converts the digital audio data into one or more text tokens (e.g., STT processing). The model or models used by such functionality, which can collectively be considered a speech recognition model, generally model the relationship between an audio signal and phonetic units in a language, along with word sequences in the language. In some implementations, speech recognition models may be acoustic models, language models, pronunciation models, etc., as well as models combining functionality of one or more of such models. In some implementations, for example, speech recognition models may be implemented as finite state decoding graphs including a plurality of paths or pathways.

Further, as described herein, multiple speech recognition models 136 for multiple different languages can be utilized in processing of audio data to generate multiple candidate semantic and/or textual representations for each of the multiple different languages. For example, in some of those implementations, each speech recognition model may generate multiple candidate speech recognition outputs, or "hypotheses." Each of the candidate speech recognition outputs/hypotheses for a given language may constitute a "guess" or "prediction" as to what the user said. If the language used by the user is a different language than a language for which a particular model is trained, there is the potential that the multiple candidate speech recognition outputs generated by that model will vary considerably from each other, semantically and/or syntactically, because the particular model is not trained to process that language. By contrast, if the language used by the user is the same language for which a particular model is trained, there is the potential that the multiple candidate speech recognition outputs will be relatively similar, semantically and/or syntactically. In various implementations, the semantic and/or syntactic variation between the multiple speech recognition outputs of a language model may be quantified in what is referred to herein as an "entropy" score or a "diversity" score.

In some implementations, an entropy score for a particular language may be determined using an equation such as the following:

$$\frac{1}{N} \sum_{i,j} d(h_i, h_j) / (|h_i| + |h_j|)$$

Here, N is a positive integer that represents the total number of hypotheses generated by the STT under model consideration that are considered in calculating the entropy score, $h_i$ represents the ith hypothesis generated for the language, $d(h_i, h_j)$ represents an edit distance between the ith hypothesis and the jth hypothesis (i and j are both positive integers), and $|h_i|$ represents the number of characters in the ith hypothesis, $h_i$. The edit distance d may be a measurement of how different two hypotheses are from each other, and in some cases may range from zero (i.e. no difference) to the sum of the number of characters in each hypothesis. Thus, in implementations in which the above equation is employed, the entropy or diversity score may be the average and length normalized edit distance between any two pair of hypotheses, and may be considered a measure of the uncertainty of the STT results. The value output by this equation may be negatively correlated to the actual cross entropy of the hypotheses produced by the STT model at issue. For example, the lower the value output by this equation, the greater the entropy, and vice versa. However, this is not meant to be limiting. Different formulas may be used for entropy approximation.

Note that in some implementations, N is not necessarily equal to the number of hypotheses generated by the particular speech recognition model 136. For example, a given speech recognition model 136 might generate numerous hypotheses. In some such instances, the actual number of hypotheses that are considered when determining the entropy score may be capped to N, e.g., based on analysis of a lattice posterior (e.g., posterior probability that results from decoding a recognition graph) of each hypothesis. In some implementations, the lattice posterior for each hypothesis h may be included in the above equation, e.g., as a scale term to the edit distance d( ). In some implementations, the actual number of hypotheses that are considered when determining the entropy score may be limited to a value of N (positive integer). In some implementation, the value N can be constant for all queries. In some implementations, the value of N may be dynamic, changing from query to query, e.g., based on comparing the probability of the hypothesis to a threshold.

Other equations are also contemplated herein. For example, in some implementations, in addition to or instead of the edit distance, a distance between two embeddings of two hypotheses, e.g., in latent semantic (or syntactic) space, may be considered. In some such embodiments, the average of the pairwise distances between all hypotheses (or the latent embeddings thereof) may be used as the entropy score for that speech recognition model.

Referring back to FIG. 1, the automated assistant 104 can operate according to one or more language models simultaneously in order to be responsive to natural language inputs from the user 130 and/or provide responsive content to the user 130. For example, in some implementations, the automated assistant 104 can operate using an invocation phrase model simultaneously with using a speech recognition model that is associated with a particular language. In this way, the automated assistant can process audio data that embodies an invocation phrase and one or more commands provided in the particular language, and be responsive to both the invocation phrase and the one or more commands. The text, and/or semantic representations of text, converted from the audio data can parsed by a text parser engine 110 and made available to the automated assistant 104 as textual data or semantic data that can be used to generate and/or identify command phrases from the user 130 and/or a third party application.

When the user 130 is communicating with an automated assistant 126 at the client computing device 118, the user 130 can provide a spoken natural language input to an assistant interface 128 of the client computing device 118. The spoken natural language input can be converted into audio data, which can be processed by a client language model 124, such as an invocation phrase model for identifying whether the audio data embodies an invocation phrase for invoking the automated assistant 126. In some implementations, the invocation phrase model can be employed at the client computing device 118 to determine whether the user 130 is intending to invoke the automated assistant 104. When the user provides a natural language input to the assistant interface 128, and the natural language input includes an invocation phrase for invoking the automated assistant 104, the client computing device 118 can cause the automated assistant 104 at the server device 102 to receive the natural language input and/or subsequent natural language inputs from the user 130.

For instance, in response to determining that the user 130 is intending to invoke the automated assistant 104 at the client computing device 118, one or more communication channels can be established between the client computing device 118 and the server device 102. Thereafter, as the user continues to provide natural language inputs to the assistant interface 128, the natural language inputs will be converted into data that is then transmitted over the network 114 and processed by the server device 102. Thereafter, multiple speech recognition models 136 may be used to process each of the natural language inputs as described herein. Based on the entropy/diversity scores, one or more speech recognition models 136 may be selected as the appropriate model for each natural language input. In some implementations, the candidate speech recognition generated by that model that has the highest confidence score may be processed by automated assistant 104 in order to determine which responsive action to perform.

Figure 2:
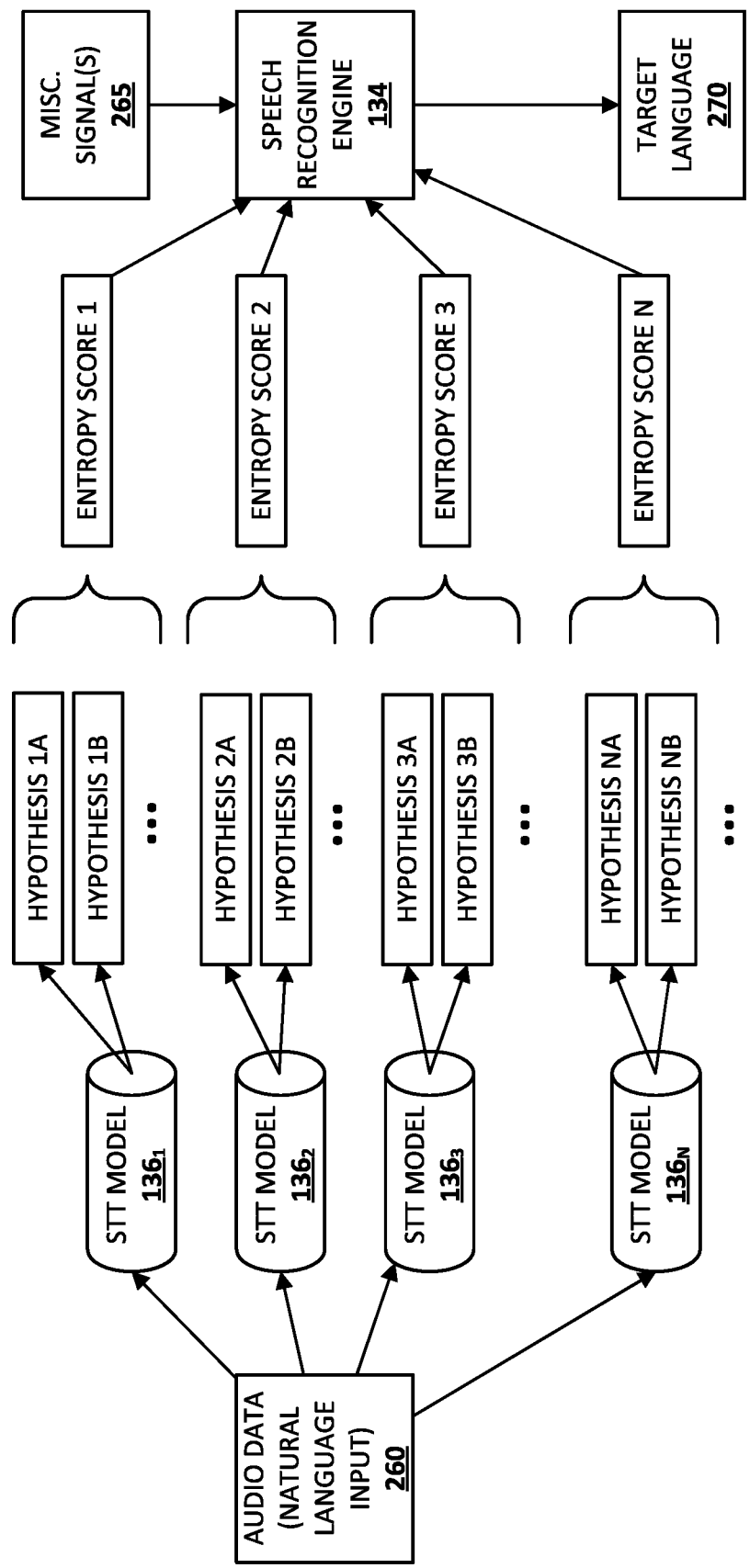
FIG. 2 illustrates a state machine that may be implemented by an automated assistant, in accordance with various implementations.

FIG. 2 illustrates a diagram that demonstrates how audio data 260, which is indicative of spoken natural language input captured at one or more microphones, may be processed to determine a language model to use for downstream processing. The audio data 260 may alternatively take the form of a recording of the spoken natural language input, an embedding generated from such a recording, a feature vector with features extracted from the recording and/or the embedding, and so forth.

The audio data 260 is first applied as input across multiple STT models $\mathbf{136}_1$-$\mathbf{136}_N$ (also referred to herein as "speech recognition models"). The number N of models employed may be selected based on various factors. For example, a user who lives in a multilingual household or works in a multilingual workplace may operate a graphical user interface or a speech interface of automated assistant 104 to select as many languages as the user desires to be used in processing. For instance, if the user lives in a bi-lingual household in which English and Spanish is spoken, the user may select those two languages, and the two corresponding STT models 136 may be used to process speech input. In some implementations, multiple dialects for a particular language may exist. In such case, the user may select one or more of those dialects, such as Castilian Spanish and Catalan Spanish.

Each STT model 136 in FIG. 2 generates at least one hypothesis, and in most cases multiple hypotheses. For example, STT model $\mathbf{136}_1$ generates a first hypothesis 1A, a second hypothesis 1B, STT model $\mathbf{136}_2$ generates a first hypothesis 1A, a second hypothesis 1B, and so forth. For each STT model 136, an entropy score is calculated based on the multiple hypotheses generated by that STT model 136, e.g., using the equation set forth previously or another equation. The entropy scores may then be provided to speech recognition engine 134. A target language 270 may be selected based at least in part on the entropy scores. For example, the language for which the lowest entropy score was generated may be selected as the target language 270. In various implementations, target language 270 may be used in downstream processing, such as in parsing, natural language processing, semantic processing, natural language generation, by a dialog state engine, and so forth. For example, if Italian is selected based on it having the lowest entropy score, then Italian natural language processing models and/or semantic processing models trained in the Italian language may be employed downstream. Natural language output provided by automated assistant 104 in response to the natural language input embodied in audio data 260 may be in Italian.

In some implementations, speech recognition engine 134 may use one or more other signals 265, in addition to entropy scores, to select target language 270. For example, signals such as confidence scores for individual hypotheses, audible-based speaker recognition, visual-based speaker recognition (e.g., facial recognition, recognition of a badge or other indicia, detection of a wireless signal emitted by a device carried by the speaker, etc.), time-of-day, languages that have been used with automated assistant 104 in the past, the context of the interaction between the user and automated assistant 104, such as a location of the user determined from a position coordinate sensor (e.g., GPS, wireless triangulation) may be considered. In some implementations, a third party application (e.g., car sharing service, food ordering service, etc.) being interacted with by automated assistant to fulfill a user's request may also be considered. Additionally or alternatively, in some implementations, information from a user's online profile 120 (see FIG. 1), which may include one or more of the aforementioned signals or additional signals, may be employed. For example, a user's profile 120 may indicate the languages she speaks, where she is going, her preferences, etc.

In some such implementations, these other factors may serve as a tie breaker for two STT models 136 with similar entropy scores. For example, suppose audio data 260 contains a request in Italian. Because both Italian and Spanish are romantic languages, it is possible that entropy scores calculated based on their respective hypotheses may be similar. In such a situation, the fact that the user is located in Italy, rather than in a Spanish-speaking country such as Spain or Mexico, may be used to break the tie. As another example, suppose the user has an online profile that indicates he or she speaks Spanish. Such a signal may be used as a tie breaker to decide that the selected target language should be Spanish, rather than Italian.

Figure 3A:
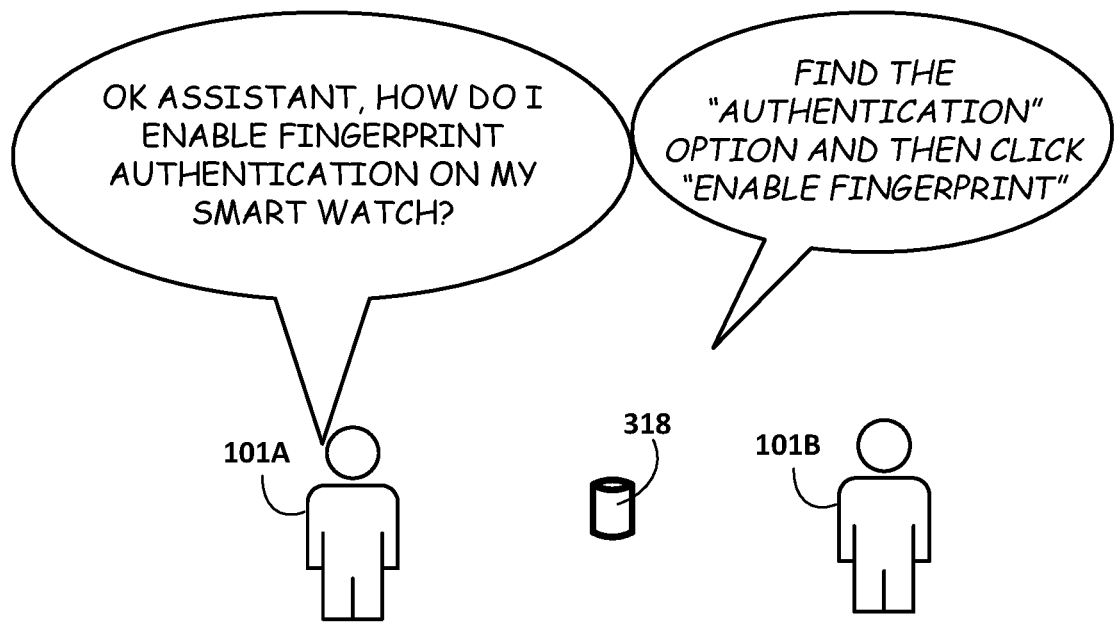
FIGS. 3A and 3B illustrate an example scenario in which techniques described herein may be employed, in accordance with various embodiments.
Figure 3B:
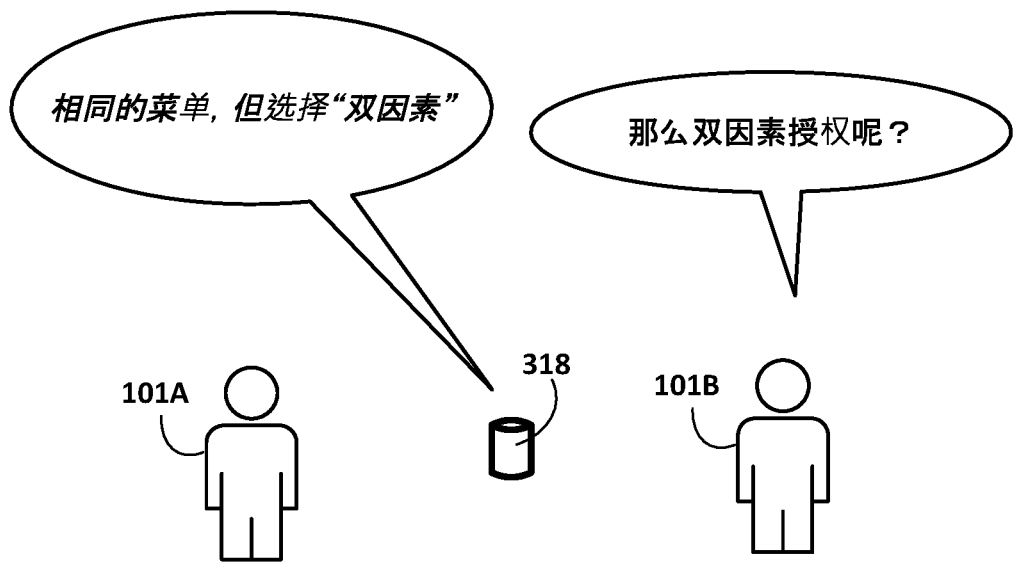

FIGS. 3A and 3B illustrate an example in which techniques described herein are implemented to facilitate a conversation between two users, 101A and 101B, and automated assistant 104 operating at least in part on a client computing device 318. In this example, client computing device 318 takes the form of a standalone interactive speaker, but this is not meant to be limiting. As noted previously, client computing device 318 may take other forms (including assistant devices), such as a vehicular computing system, a smart television, a "dumb" television equipped with a networked fob that is usable to engage automated assistant 104, a smart watch, a smart phone, an assistant-equipped smart appliance, and so forth.

In FIG. 3A, first user 101A asks, "OK Assistant, how do I enable fingerprint authentication on my smart watch?" Automated assistant 104 may or may not use techniques described herein to determine that first user 101A spoke English. For example, automated assistant 104 may process every request in a native language set by first user 101A—in this example, English—in parallel with using techniques described herein to identify other languages that might have been used by the speaker. If a confidence measure of the English STT output is greater than some threshold, or is sufficiently greater than the highest confidence measure of the language selected using techniques described herein, English may be selected. Alternatively, in some implementations, techniques described herein may be used to process audio data capturing every utterance. Or, in some implementations, one or more misc. signals 265 may be used (e.g., location, speaker's identity determined using speaker recognition, etc.) to determine whether the default language (e.g., English in FIG. 3A) should be used, whether techniques described herein should be used exclusively to select the target language, or whether the default language should be used in parallel with techniques described herein.

FIG. 3B depicts an example of how the conversation may continue. In FIG. 3B, the other user 101B asks, in Chinese, the question, "'那么双因素授权呢？'" This translates in English to "What about two-factor authentication?" In some implementations in which an English STT model and techniques described herein are employed in parallel, the output from the English STT model would likely have a low confidence measure (e.g., below a threshold). By contrast, the Chinese STT model selected using techniques described herein—i.e. the model likely having the lowest entropy score—may have a much greater confidence measure. Accordingly, the output of the Chinese STT model may be employed instead, and downstream processing may or may not likewise employ Chinese models and/or elements. As shown in FIG. 3B, automated assistant 104 replies, "相同的菜单,但选择'双因素'". In English this translates to "Same menu, but select 'two-factor'".

In some implementations, automated assistant 104 may select various attributes of natural language output based on the selected language. For example, suppose a question such as "How far from Louisville Ky. is Frankfort Ky.?" is posed in Chinese. China is a country that typically employs the metric system. Accordingly, in various implementations, the answer may be provided in kilometers (and in Chinese). On the other hand, if the same question were posed in English, automated assistant 104 may respond in Imperial units instead (and in English).

Figure 4:
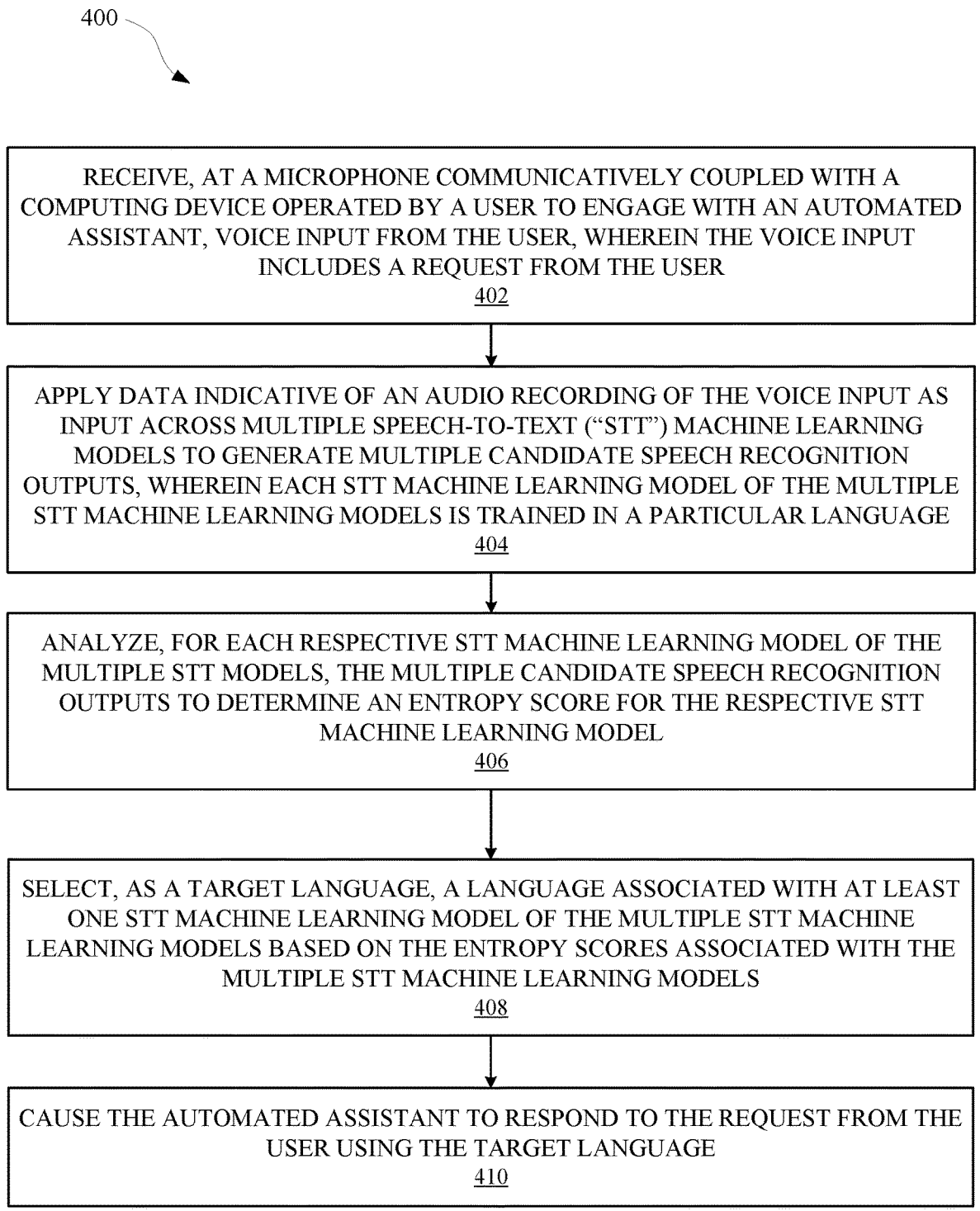
FIG. 4 depicts an example method for practicing selected aspects of the present disclosure, in accordance with various embodiments.

FIG. 4 depicts an example method 400 for practicing selected aspects of the present disclosure, in accordance with various embodiments. For convenience, the operations of the flow chart are described with reference to a system that performs the operations. This system may include various components of various computer systems, including components depicted in FIG. 1. Moreover, while operations of method 400 are shown in a particular order, this is not meant to be limiting. One or more operations may be reordered, omitted or added.

At block 402, the system may receive, e.g., at a microphone of a computing device (e.g., 118) operated by a user to engage with an automated assistant (e.g., 104) or at another microphone communicatively coupled with the computing device, voice input from the user. The voice input may include a request from the user, such as a request for information (e.g., weather), a request to perform some responsive action (e.g., call a ride share vehicle, start a timer, operate smart appliance(s), etc.), and so forth.

At block 404, the system may apply data indicative of an audio recording of the voice input, such as the audio recording itself, an embedding, a feature vector, etc., as input across multiple STT machine learning models (e.g., 136) to generate multiple candidate speech recognition outputs (or "hypotheses"). Each STT machine learning model of the multiple STT machine learning models may be trained in a particular language. As noted previously, these models may take various forms, such as neural networks, hidden Markov models, etc.

At block 406, the system may analyze, for each respective STT machine learning model of the multiple STT models, the multiple candidate speech recognition outputs to determine an entropy score for the respective STT machine learning model. Various equations and/or heuristics, such as the equation set forth above, may be employed. For example, the equation set forth above relies on normalized edit distance (i.e. differences between the hypotheses). Other implementations may rely on distances of reduced-dimensionality embeddings of the multiple candidate speech recognition outputs in latent space. Additionally or alternatively, other factors that may be considered when calculating entropy scores include, but are not limited to, a count of hypotheses generated by a given STT model, a count of hypotheses generated by a given STT model that satisfy some criteria (e.g., a confidence threshold), semantic differences between the hypotheses (which may be determined from embedding them into semantic latent space, for instance), and so forth.

As noted previously, there may be numerous different STT models for numerous different languages. Applying all models in all cases may be wasteful from a computing resource standpoint. Accordingly, in various implementations, various factors, such as one or more misc. signals 265, may be used to select which STT models are used. For example, in some implementations, the multiple STT machine learning models that are ultimately used may be a subset of a superset of STT machine learning models. The subset of STT models that are actually used may be selected from the superset based on various signals, such as a historical context of the computing device, a current context of the computing device, settings previously set by the user for the automated assistant, time-of-day, historical usage, a user's profile 120 (e.g., which may be consulted upon recognizing the user by way of their visual appearance or speech), and so forth.

At block 408, the system may select, as a target language, the language associated with (e.g., the language used to train) at least one STT machine learning model of the multiple STT machine learning models based at least in part on the entropy scores associated with the multiple STT machine learning models. As noted previously, in some implementations, other misc. signals (e.g., 265) may also be considered, e.g., as a tie breaker. The output of the selected STT model, which in some embodiments may be one or more hypotheses having the highest confidence measure(s), may be used for downstream processing. In some implementations, the entropy score itself may be used to determine a confidence measure of the STT output. Suppose a particular STT model has the lowest entropy score, and therefore is selected. However, the entropy score for that STT model may still be relatively large, e.g., when the speaker did not articulate the request clearly. In some implementations, this relatively large entropy score may influence the confidence scores calculated for each hypothesis generated from that STT model. If those confidences fail to satisfy some threshold, automated assistant 104 may seek further confirmation and/or disambiguation from the user.

At block 410, the system may cause the automated assistant to respond to the request from the user using the target language. For example, in some implementations, downstream components such as natural language processors, semantic processors, dialog state engines, natural language generators, etc., that are tailored towards the selected target language may be utilized to process the user's request. Additionally or alternatively, in some implementations, the user's request may be embedded into a semantic latent space in which the syntax of the request is more or less disregarded or discarded in favor of a semantically-rich feature representation. In some such implementations, at least some downstream components that are employed to process the user's request may be language-neutral. In some cases, responding to the user's request may include generating and providing natural language output, which may be presented audibly (e.g., by way of a speech synthesizer) and/or visually. In some such cases, the language used to generate the natural language output may be the selected target language, and where applicable, the speech synthesizer may be selected based on the target language.

Figure 5:
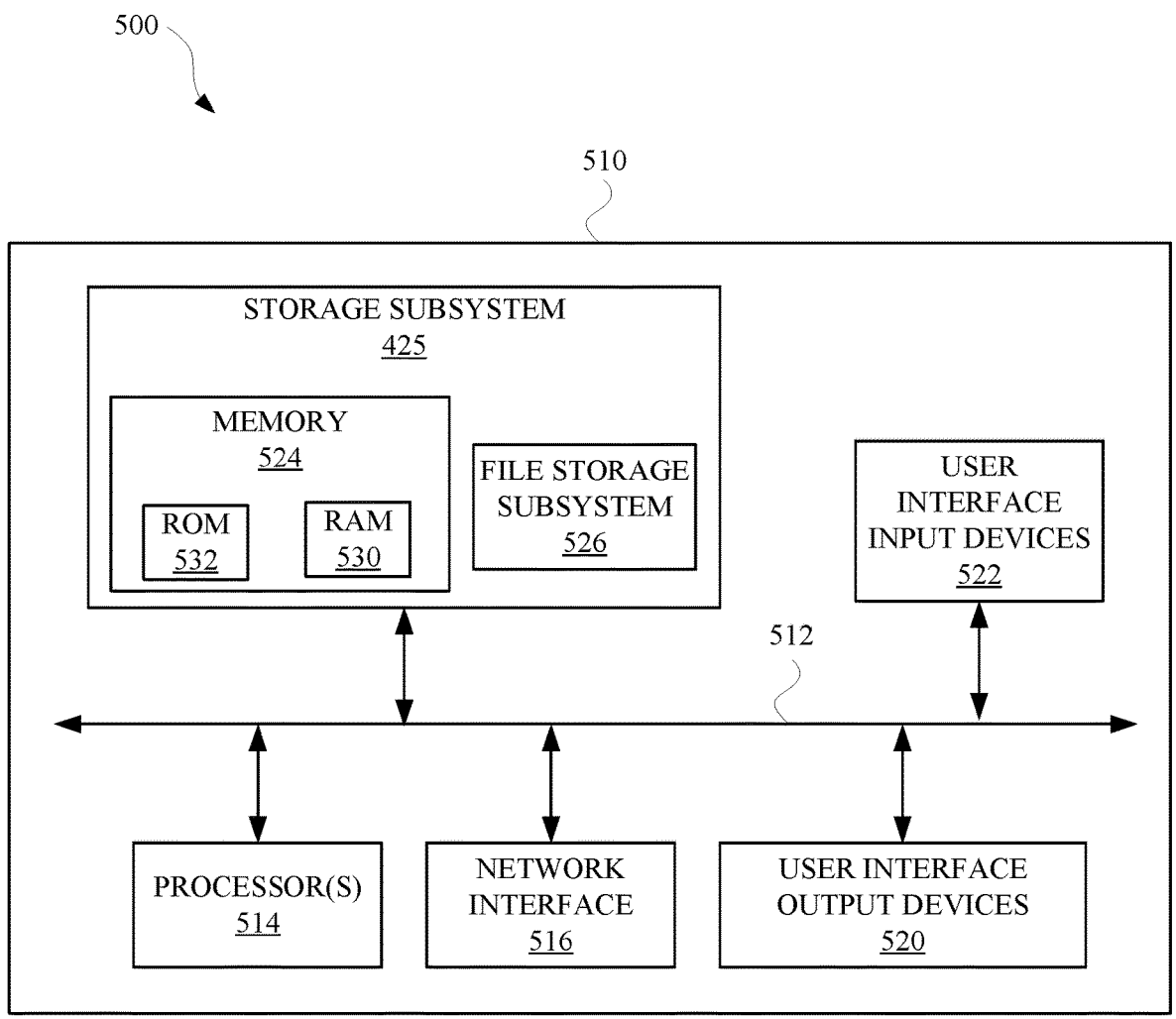
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of server device 102, client computing device 118, portable computing device 132, and/or any other device or operation discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
receiving, at a microphone of a computing device operated by a user to engage with an automated assistant, voice input from the user, wherein the voice input includes a request from the user;
applying data indicative of an audio recording of the voice input as input across multiple speech-to-text ("STT") machine learning models to generate, for each STT machine learning model, a respective plurality of candidate speech recognition outputs, wherein each STT machine learning model of the multiple STT machine learning models is trained to generate speech recognition outputs in a different language;
for each respective STT machine learning model of the multiple STT models:
comparing content of one of the respective plurality of candidate speech recognition outputs generated based on that respective STT machine learning model with content of at least one other of the respective plurality of candidate speech recognition outputs generated based on that respective STT machine learning model, and based on the comparing, determining a diversity score for the respective STT machine learning model;

selecting, as a target language, the language associated with at least one STT machine learning model of the multiple STT machine learning models based on the multiple different diversity scores associated with the multiple different STT machine learning models; and causing the automated assistant to respond to the request from the user using the target language.

2. The method of claim 1, wherein the diversity score for the respective STT machine learning model is determined based on differences between the respective plurality of candidate speech recognition outputs of the respective STT model.

3. The method of claim 1, wherein the diversity score for the respective STT machine learning model is determined based on semantic distances between embeddings of the respective plurality of candidate speech recognition outputs generated based on the respective STT model in latent space.

4. The method of claim 1, wherein selecting the target language is further based on one or more of: historical context of the computing device, current context of the computing device, or confidence scores calculated for each candidate speech recognition output.

5. The method of claim 1, wherein the diversity score for each respective STT machine learning model is calculated using two or more of the respective plurality of candidate speech recognition outputs generated by the respective STT machine learning model that have confidence scores above a particular threshold.

6. The method of claim 1, further comprising causing the automated assistant to prompt the user for confirmation before performing any task based on the user's request if the diversity score for the selected STT machine learning model satisfies a pre-determined threshold.

7. The method of claim 1, wherein the causing comprises causing the automated assistant to provide, as audio output, a natural language response to the request of the user, wherein the natural language response is provided in the target language.

8. The method of claim 1, wherein the multiple STT machine learning models comprise a subset of a superset of STT machine learning models, and wherein the method further includes selecting the subset from the superset based on one or more of: a historical context of the computing device, a current context of the computing device, or settings previously set by the user for the automated assistant.

9. A system comprising one or more processors and memory operably coupled with the one or more processors, wherein the memory stores instructions that, in response to execution of the instructions by one or more processors, cause the one or more processors to:

receive, at a microphone of a computing device operated by a user to engage with an automated assistant, voice input from the user, wherein the voice input includes a request from the user;

apply data indicative of an audio recording of the voice input as input across multiple speech-to-text ("STT") machine learning models to generate, for each STT machine learning model, a respective plurality of candidate speech recognition outputs, wherein each STT machine learning model of the multiple STT machine learning models is trained to generate speech recognition outputs in a different language;

for each respective STT machine learning model of the multiple STT models:

compare content of one of the respective plurality of candidate speech recognition outputs generated based on that respective STT machine learning model with content of at least one other of the respective plurality of candidate speech recognition outputs generated based on that respective STT machine learning model, and based on the comparison, determine a diversity score for the respective STT machine learning model;

select, as a target language, the language associated with at least one STT machine learning model of the multiple STT machine learning models based on the multiple different diversity scores associated with the multiple different STT machine learning models; and cause the automated assistant to respond to the request from the user using the target language.

10. The system of claim 9, wherein the diversity score for the respective STT machine learning model is determined based on differences between the respective plurality of candidate speech recognition outputs of the respective STT model.

11. The system of claim 9, wherein the diversity score for the respective STT machine learning model is determined based on semantic distances between the respective plurality of candidate speech recognition outputs of the respective STT model in latent space.

12. The system of claim 9, wherein selecting the target language is further based on one or more of: historical context of the computing device, current context of the computing device, or confidence scores calculated for each candidate speech recognition output.

13. The system of claim 9, wherein the diversity score for each respective STT machine learning model is calculated using one or more of the respective plurality of candidate speech recognition outputs generated by the respective STT machine learning model that have confidence scores above a particular threshold.

14. The system of claim 9, further comprising causing the automated assistant to prompt the user for confirmation before performing any task based on the user's request if the diversity score for the selected STT machine learning model satisfies a pre-determined threshold.

15. The system of claim 9, wherein the causing comprises causing the automated assistant to provide, as audio output, a natural language response to the request of the user, wherein the natural language response is provided in the target language.

16. At least one non-transitory computer-readable medium comprising instructions that, in response to execution of the instructions by one or more processors, cause the one or more processors to perform the following operations:

receiving, at a microphone of a computing device operated by a user to engage with an automated assistant, voice input from the user, wherein the voice input includes a request from the user;

applying data indicative of an audio recording of the voice input as input across multiple speech-to-text ("STT") machine learning models to generate, for each STT machine learning model, a respective plurality of candidate speech recognition outputs, wherein each STT machine learning model of the multiple STT machine learning models is trained to generate speech recognition outputs in a different language;

for each respective STT machine learning model of the multiple STT models:

compare content of the respective plurality of candidate speech recognition outputs generated based on the respective STT machine learning model with content of at least one other of the respective plurality of candidate speech recognition outputs generated based on that respective STT machine learning model, and based on the comparison, determine a diversity score for the respective STT machine learning model;

selecting, as a target language, the language associated with at least one STT machine learning model of the multiple STT machine learning models based on the multiple different diversity scores associated with the multiple different STT machine learning models; and causing the automated assistant to respond to the request from the user using the target language.

17. The at least one non-transitory computer-readable medium of claim 16, wherein the diversity score for the respective STT machine learning model is determined based on semantic distances between the respective plurality of candidate speech recognition outputs of the respective STT model in latent space.

\* \* \* \* \*